(12) United States Patent
Tadokoro et al.

(10) Patent No.: US 10,047,764 B2
(45) Date of Patent: Aug. 14, 2018

(54) PROPELLER FAN, AND AIR BLOWER, AIR CONDITIONER, AND HOT-WATER SUPPLY OUTDOOR UNIT INCLUDING THE SAME

(71) Applicant: Mitsubishi Electric Corporation, Tokyo (JP)

(72) Inventors: Takahide Tadokoro, Tokyo (JP); Yasuaki Kato, Tokyo (JP); Atsushi Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 579 days.

(21) Appl. No.: 14/417,894

(22) PCT Filed: Jul. 18, 2013

(86) PCT No.: PCT/JP2013/069505
§ 371 (c)(1),
(2) Date: Jan. 28, 2015

(87) PCT Pub. No.: WO2014/024654
PCT Pub. Date: Feb. 13, 2014

(65) Prior Publication Data
US 2015/0176597 A1   Jun. 25, 2015

(30) Foreign Application Priority Data
Aug. 10, 2012 (WO) .................. PCT/JP2012/070507

(51) Int. Cl.
*F04D 29/38* (2006.01)
*F04D 19/00* (2006.01)
(Continued)

(52) U.S. Cl.
CPC ......... *F04D 29/384* (2013.01); *F04D 19/002* (2013.01); *F04D 29/545* (2013.01);
(Continued)

(58) Field of Classification Search
None
See application file for complete search history.

(56) References Cited

U.S. PATENT DOCUMENTS 1,041,912 A * 10/1912 Tyson .................. F04D 29/384
416/237
1,041,913 A * 10/1912 Tyson .................. F04D 29/384
416/236 A
(Continued)

FOREIGN PATENT DOCUMENTS

EP     2 873 867 A1    5/2015
JP     62-282198 A    12/1987
(Continued)

OTHER PUBLICATIONS

Communication pursuant to Article 94(3) EPC dated Jan. 2, 2017 issued in corresponding EP patent application No. 13 828 647.1.
(Continued)

*Primary Examiner* — John K Fristoe, Jr.
*Assistant Examiner* — Daphne M Barry
(74) *Attorney, Agent, or Firm* — Posz Law Group, PLC

(57) ABSTRACT

In a blade cross-sectional view, assuming that a tangent at an end of the outer periphery is defined as LQ, an imaginary line orthogonal to the rotation axis is defined as LO, an angle formed by the tangent (LQ) and the imaginary line (LO) is defined as an outer peripheral end tangent angle (θ), and a position at which an imaginary plane including a position of an intake-side end portion of the bellmouth and a peripheral edge of the blade cross each other is defined as an overlap starting point, the outer peripheral end tangent angle on a trailing edge portion side with respect to a blade cross section including the overlap starting point is set to be smaller than the outer peripheral end tangent angle on a
(Continued)

leading edge portion side with respect to the blade cross section including the overlap starting point.

10 Claims, 13 Drawing Sheets

(51) Int. Cl.
*F04D 29/54* (2006.01)
*F04D 29/66* (2006.01)

(52) U.S. Cl.
CPC ...... *F04D 29/667* (2013.01); *F05D 2240/301* (2013.01); *F05D 2240/307* (2013.01)

(56) References Cited

U.S. PATENT DOCUMENTS

| | | | | |
|---|---|---|---|---|
| 1,964,525 A * | 6/1934 | McMahan | ............. | F04D 29/384 416/242 |
| 1,995,193 A * | 3/1935 | Stilphen | ................ | F04D 29/384 416/234 |
| 5,616,004 A * | 4/1997 | Alizadeh | ............... | F04D 29/384 415/119 |
| 6,116,856 A * | 9/2000 | Karadgy | ................. | B64C 11/00 29/888.025 |
| 6,503,060 B1 * | 1/2003 | Kamada | ................ | F04D 29/703 415/121.2 |
| 6,796,771 B2 * | 9/2004 | Suzuki | .................. | F04D 29/384 416/228 |
| 6,994,523 B2 * | 2/2006 | Eguchi | .................. | F04D 29/384 416/228 |
| 7,025,642 B1 * | 4/2006 | Baylor | ..................... | B63H 1/14 416/197 R |
| 8,007,243 B2 * | 8/2011 | Arinaga | ................. | F04D 29/384 415/119 |
| 2006/0171804 A1 * | 8/2006 | Brown | .................. | F04D 29/544 415/220 |
| 2013/0101420 A1 * | 4/2013 | Nakashima | ........... | F04D 29/384 416/204 R |
| 2015/0159671 A1 * | 6/2015 | Tadokoro | .............. | F04D 29/384 416/243 |

FOREIGN PATENT DOCUMENTS

| | | |
|---|---|---|
| JP | 06-229398 A | 8/1994 |
| JP | 09-287595 A | 11/1997 |
| JP | 2002-257381 A | 9/2002 |
| JP | 2003-148395 A | 5/2003 |
| JP | 2006-233886 A | 9/2006 |
| JP | 2011-179330 A | 9/2011 |
| WO | 03/072948 A1 | 9/2003 |

OTHER PUBLICATIONS

International Search Report of the International Searching Authority dated Aug. 13, 2013 for the corresponding international application No. PCT/JP2013/069505 (and English translation).

Extended European Search Report dated Feb. 10, 2016 issued in corresponding EP patent application No. 13828647.1.

* cited by examiner

PROPELLER FAN, AND AIR BLOWER, AIR CONDITIONER, AND HOT-WATER SUPPLY OUTDOOR UNIT INCLUDING THE SAME

CROSS REFERENCE TO RELATED APPLICATION

This application is a U.S. national stage application of PCT/JP2013/069505 filed on Jul. 18, 2013, which claims priority to international application no. PCT/JP2012/070507 filed on Aug. 10, 2012, the contents of which are incorporated herein by reference.

TECHNICAL FIELD

The present invention relates to a propeller fan, and an air blower, an air conditioner, and a hot-water supply outdoor unit including the propeller fan.

BACKGROUND ART

As propeller fans to be used in air conditioners and the like, Patent Literature 1 discloses such a propeller fan that a part of the propeller fan on an outer peripheral side thereof is formed into a concave arc shape in a blade cross section, and the radius of curvature of the arc is increased as approaching from a leading edge to a trailing edge so as to suppress generation of a blade tip vortex caused by a leakage flow directed from a leeward side to a windward side.

Further, Patent Literature 2 discloses such a configuration that a force applied from a blade to air is directed inwardly by tilting the blade to a downstream side as approaching toward a trailing edge so that air blow speed is made uniform to suppress noise.

CITATION LIST

Patent Literature

[PTL 1] JP 2003-148395 A (FIGS. 1 and 3)
[PTL 2] JP 06-229398 A (FIGS. 1 and 8)

SUMMARY OF INVENTION

Technical Problem

In the air blowers, there is a demand for both increase in air-blowing rate (rate of air to be blown) and reduction in noise. In this case, first, regarding the noise, when a flow, which leaks from an outer peripheral portion of a blade, occurs, there may cause problems in that the disturbance increases due to the generation of a blade tip vortex, and the noise also increases. On the other hand, when the blade is tiled inwardly so as to suppress the flow leaking from the outer peripheral portion of the blade, there may arise a problem in that the surface of the blade is directed inwardly in the fan, and an axial component becomes insufficient among force components applied to an air current by the fan, thereby decreasing the rate of air to be blown.

Regarding those problems, in the above-mentioned configuration of Patent Literature 1, there is a risk in that the blade tip vortex generated from the outer peripheral portion of the blade interferes with a bellmouth while flowing to the downstream side, thereby increasing noise. Specifically, the bellmouth is set on an outer peripheral side of the propeller fan used in air conditioners, and the clearance between the bellmouth and the outer periphery of the fan is generally as narrow as about 5 mm to about 10 mm so that noise may increase when a disturbed air current impinges against the bellmouth. Further, the loss of energy is also caused due to the friction resistance generated between the swirling air current and the bellmouth.

On the other hand, in the configuration of Patent Literature 2, the flow leaking from the outer peripheral portion of the blade can be reduced by inwardly directing the force applied from the blade to the air current. However, there is a problem in that the axial force component becomes small at an exit (trailing edge) of the blade, and the air-blowing rate with respect to the number of rotations therefore decreases, with the result that the energy required for air blowing increases. That is, in the configuration of Patent Literature 2, the suppression of the leakage can be expected to some degree, but it is considered to be rather difficult to increase the air-blowing rate.

In view of the above-mentioned circumstances, it is an object of the present invention to provide a propeller fan capable of achieving lower noise by suppressing the leakage flow of an air current, and also achieving higher efficiency by increasing the rate of air to be blown.

Solution to Problem

In order to achieve the above-mentioned object, according to one embodiment of the present invention, there is provided a propeller fan, including: a boss including a rotation axis; a plurality of blades formed on an outer periphery of the boss; and a bellmouth arranged so as to surround the plurality of blades at a trailing edge side of each of the blades. The blade has a bending portion that bulges toward an upstream side in a cross-sectional shape in a radial direction. In a blade cross-sectional view, assuming that a tangent at an end of the outer periphery is defined as LQ, an imaginary line orthogonal to the rotation axis O is defined as LO, an angle formed by the tangent LQ and the imaginary line LO is defined as an outer peripheral end tangent angle θ, and a position at which an imaginary plane including a position of an intake-side end portion of the bellmouth and a peripheral edge of the blade cross each other is defined as an overlap starting point, the outer peripheral end tangent angle θ on a trailing edge portion side with respect to a blade cross section including the overlap starting point is set to be smaller than the outer peripheral end tangent angle θ on a leading edge portion side with respect to the blade cross section including the overlap starting point.

Advantageous Effects of Invention

According to the propeller fan of the present invention, it is possible to achieve lower noise by suppressing the leakage flow of the air current, and to achieve higher efficiency by increasing the rate of air to be blown.

DESCRIPTION OF EMBODIMENTS

Figure 1:
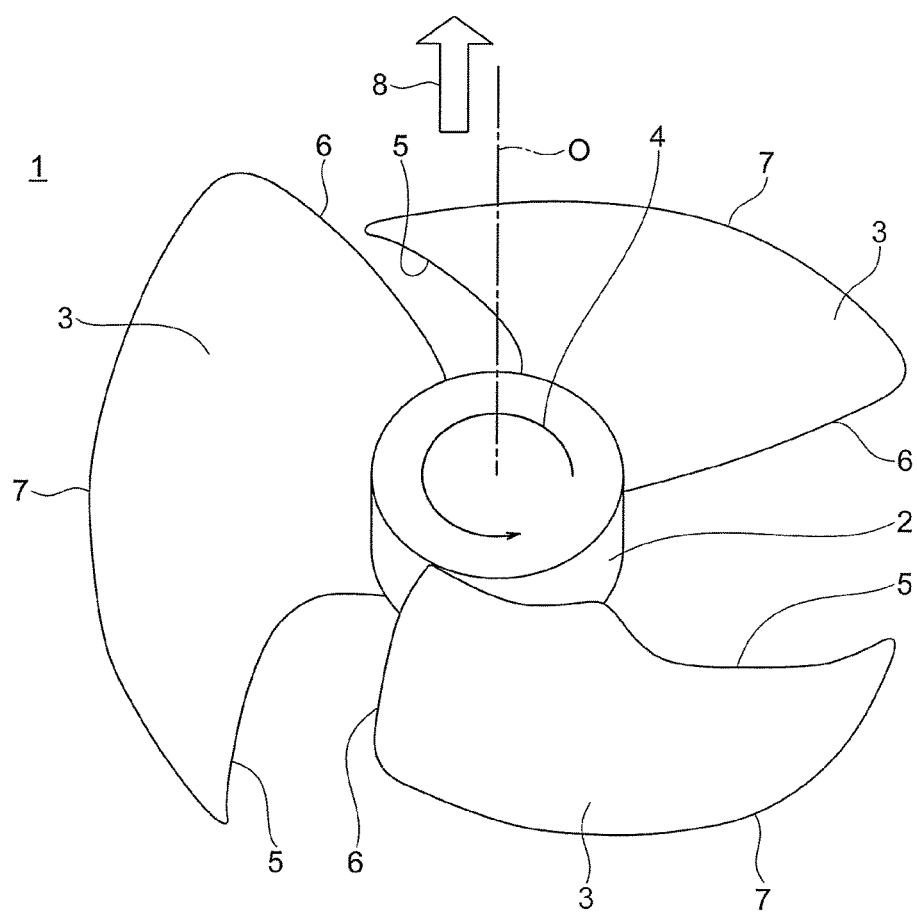
FIG. 1 is a perspective view of a propeller fan according to a first embodiment of the present invention when seen from a downstream side.

Now, a propeller fan according to embodiments of the present invention is described with reference to the accompanying drawings. Note that, in the drawings, the same reference symbols represent the same or corresponding parts.

First Embodiment

FIG. 1 is a perspective view of a propeller fan according to a first embodiment of the present invention when seen from a downstream side. In a propeller fan 1, a plurality of blades 3 are arranged around a boss 2 set at a rotation axis O. The arrow denoted by reference symbol 4 indicates a rotation direction. A peripheral edge of each of the blades 3 includes a leading edge 5 positioned on a forward side in the rotation direction, a trailing edge 6 positioned on an opposite side of the leading edge 5, and an outer side edge 7 positioned on a radially outer side so as to connect the leading edge 5 and the trailing edge 6 to each other. Further, the arrow denoted by reference symbol 8 indicates an air current direction.

Figure 2:
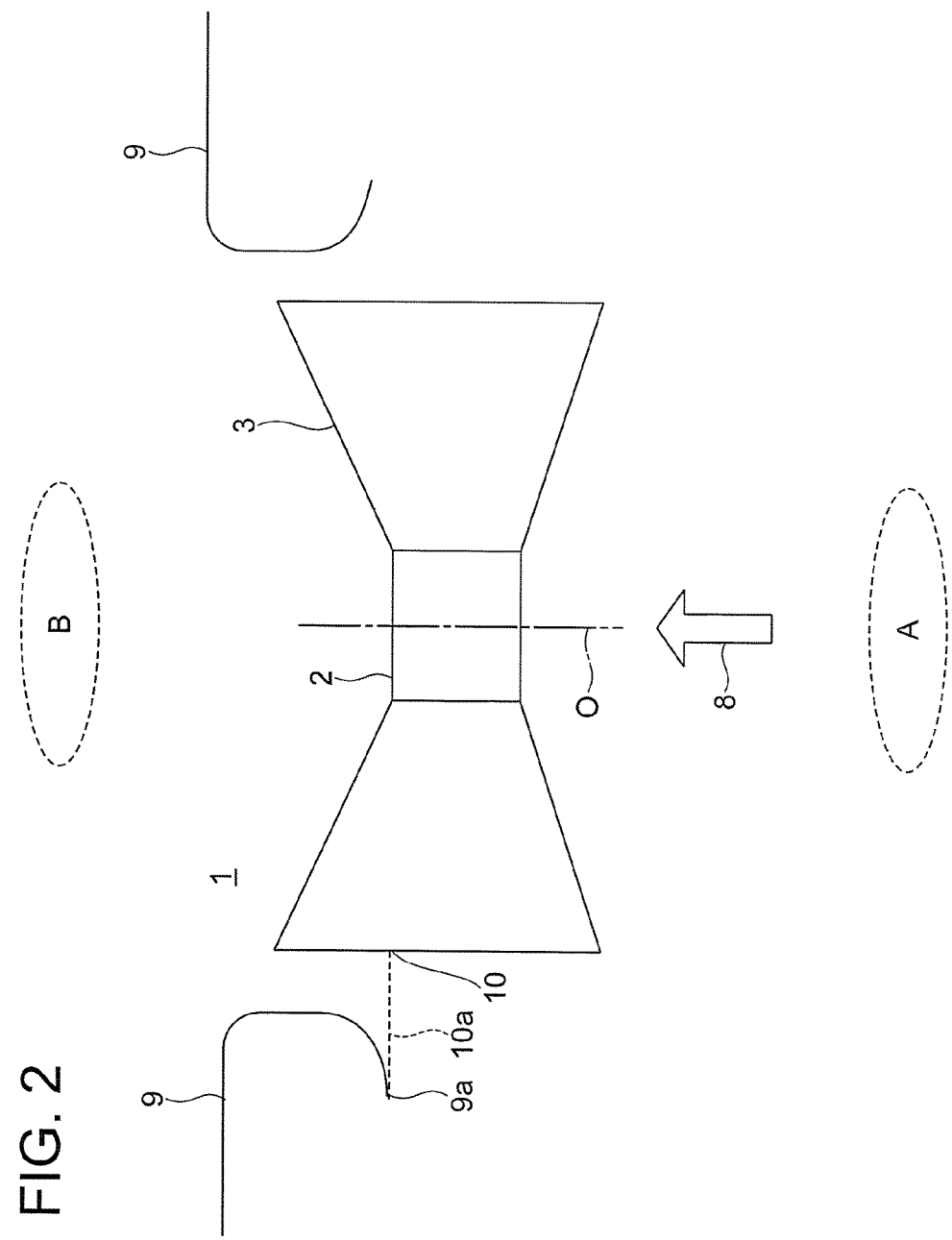
FIG. 2 is a view of the propeller fan of FIG. 1 when seen from a lateral side.

FIG. 2 is a view of the propeller fan of FIG. 1 when seen from a lateral side. In FIG. 2, the propeller fan 1 is illustrated so that a rotation locus is projected on a surface including the rotation axis O. As is understood from FIG. 2, the propeller fan 1 is arranged so as to be surrounded by an annular bellmouth 9 from outside in the radial direction. A predetermined clearance is secured between the propeller fan 1 and the bellmouth 9.

An upstream side A and a downstream side B of the propeller fan 1 are partitioned by the bellmouth 9. Further, as illustrated in FIG. 2, the propeller fan 1 also includes a region not surrounded by the bellmouth 9. Assuming that an imaginary plane 10a has the rotation axis O as a normal to the imaginary plane 10a and includes a position of an intake-side end portion 9a of the bellmouth 9, a position where the imaginary plane 10a and the peripheral edge of the blade 3 cross each other is referred to as an overlap starting point 10 in the description. In FIG. 2, a region of each of the blades 3 on the upstream side with respect to the overlap starting point 10 is not surrounded by the bellmouth 9 and is kept open in a space on the upstream side A.

Figure 3:
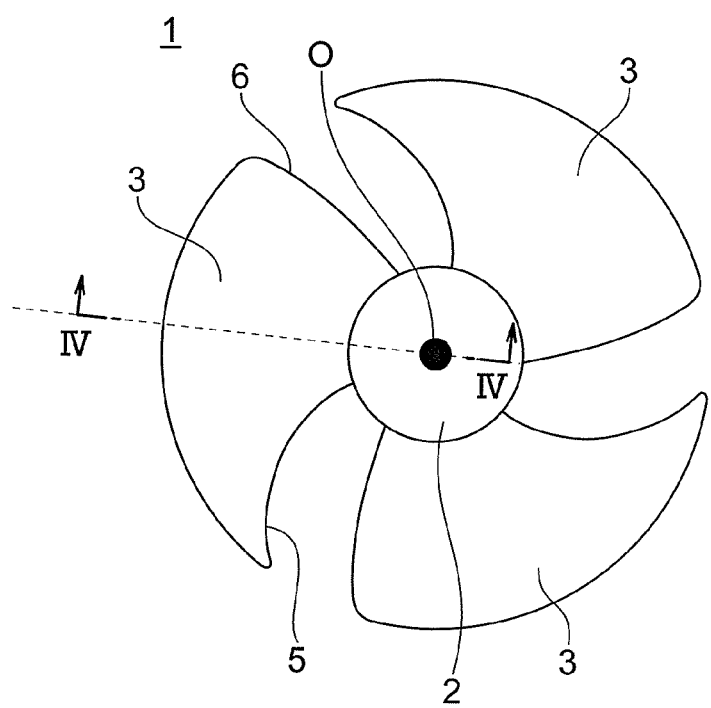
FIG. 3 is a view of the propeller fan of FIG. 1 when seen from a direction of a rotation axis.
Figure 4:
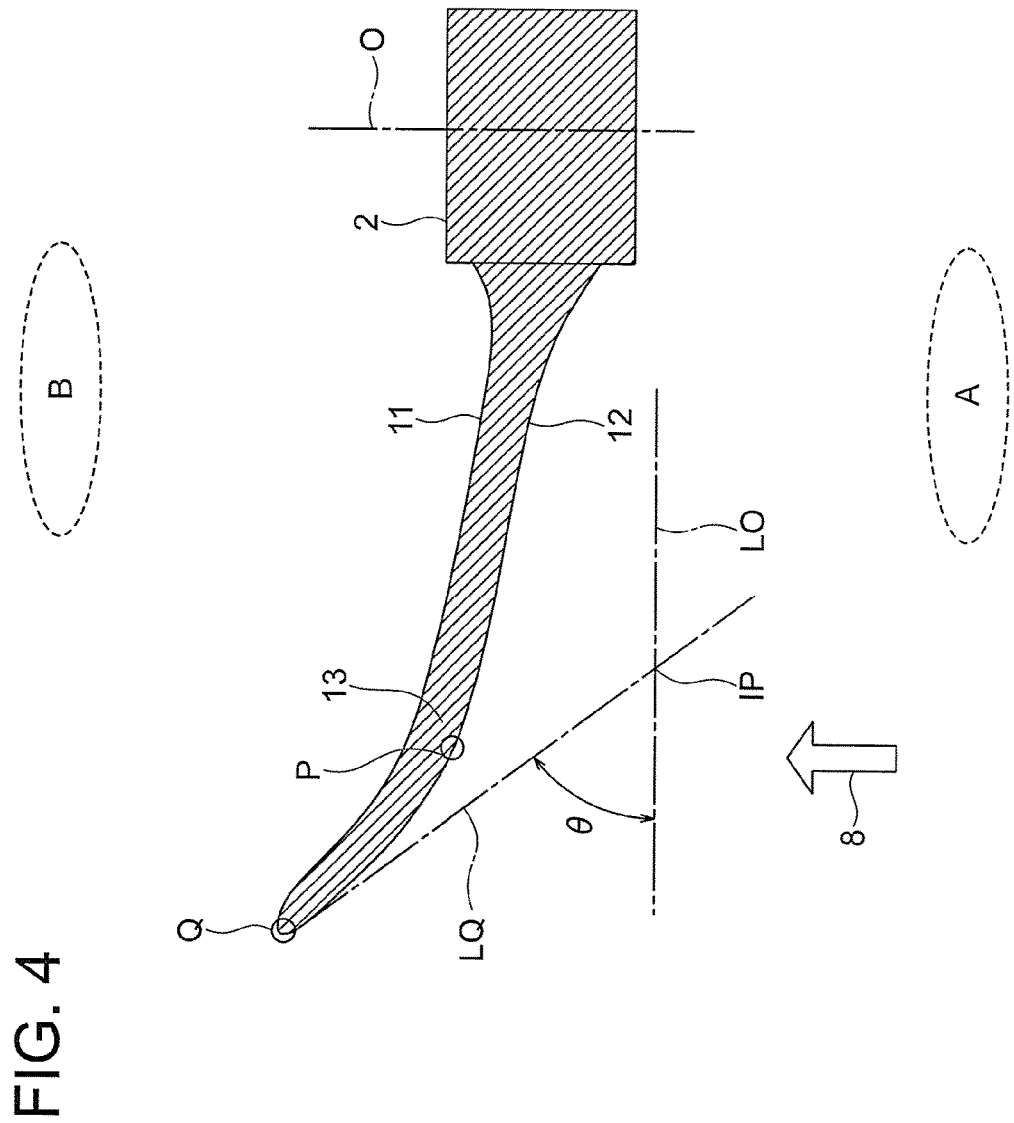
FIG. 4 is a radial sectional view taken along the line IV-IV of FIG. 3.

FIG. 3 is a view of the propeller fan when seen from a direction of the rotation axis, and FIG. 4 is a radial sectional view taken along the line IV-IV of FIG. 3. In each of the blades 3, a blade surface on the downstream side with respect to the air current direction serves to push an air current by the rotation of the fan and is referred to as a pressure surface 11 or a positive pressure surface, and a blade surface on the upstream side with respect to the air current direction is referred to, on the other hand, as a negative pressure surface 12.

As illustrated in FIG. 4, each of the blades 3 has a bending portion 13 that bulges toward the upstream side of a blade cross section, that is, on the negative pressure surface 12 side. An apex of the bending portion 13 is defined as "P". Further, an outer peripheral end of the blade on the radially outer side with respect to the apex P when seen in the blade cross section is defined as "Q". Then, a tangent on the outer peripheral end Q of the blade is defined as "LQ", and an imaginary line orthogonal to the rotation axis O when seen in the blade cross section is defined as "LO". An angle formed by the two lines LQ and LO is defined as an outer peripheral end tangent angle θ. When an intersection between the tangent LQ and the imaginary line LO is defined as "IP" in the drawing sheet of FIG. 4, the outer peripheral end tangent angle θ is an angle formed by a part of the imaginary line LO on an outer peripheral side with respect to the intersection IP and a part of a line segment of the tangent LQ in a range between the outer peripheral end Q of the blade and the intersection IP.

In the case where the outer peripheral end tangent angle in a leading edge portion is compared to that in a trailing edge portion under the above-mentioned presumption, one of the features of this embodiment resides in that the outer peripheral end tangent angle θ in the trailing edge portion is smaller than that in the leading edge portion, that is, the outer peripheral end tangent angle θ becomes smaller toward the trailing edge portion. Further, regarding the relationship with the bellmouth, one of the features of this embodiment resides in that, when a position of the blade cross section including the above-mentioned overlap starting point 10 is defined as a corresponding point of the overlap starting point, the outer peripheral and tangent angle θ on the trailing edge portion side with respect to the corresponding point of the overlap starting point is smaller than the outer peripheral end tangent angle θ on the leading edge portion side with respect to the corresponding point of the overlap starting point. In an example of this embodiment, the diameter of the boss is about 30% of the diameter of the fan, and the apex P of the bending portion 13 is set at a position away from the rotation axis O by about 60% or more of the radius so as to serve to suppress a flow leaking from the outer periphery of the blade. Further, when a base of the blade cross section on the negative pressure surface 12 side is compared to the outer peripheral end Q of the blade, the outer peripheral end of the blade serves as a swept blade mounted on the downstream side.

Figure 5:
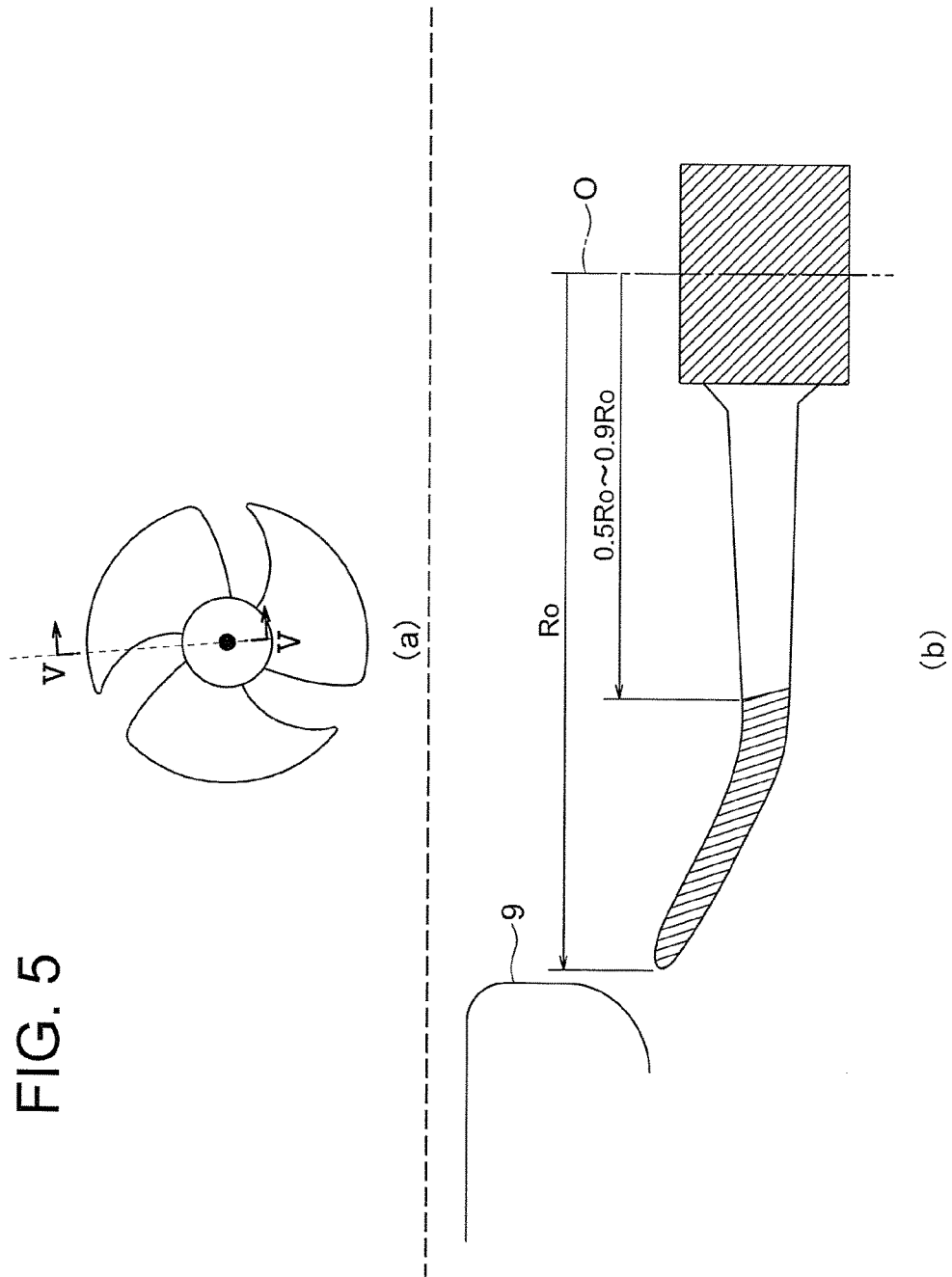
FIG. 5 are radial sectional views of the vicinity of a leading edge of a blade of the propeller fan.

Now, the definition of the cross section in the radial direction is described. FIG. 5(b) illustrates a cross section in a radial direction taken along the line V-V of FIG. 5 (a). The leading edge of the blade has, in most cases, a shape that extends further forward in the rotation direction toward the outer periphery side, and as illustrated in FIG. 5(a), the entire cross section from the boss to the outer peripheral edge may not appear in the cross section in the radial direction connecting the rotation center to the leading edge.

The apex of the bending portion is set at a position away from the rotation axis O by about 60% or more of the radius as described above, and hence a cross-sectional shape is considered within a range in which the blade cross section on an outer side of from about 50% to about 90% of a radius Ro of the fan appears. Specifically, the "leading edge portion" and the "trailing edge portion" as used herein respectively refer to a cross section on the most leading edge side and a cross section on the most trailing edge side in the range in which the blade cross section appears as described above.

Figure 6:
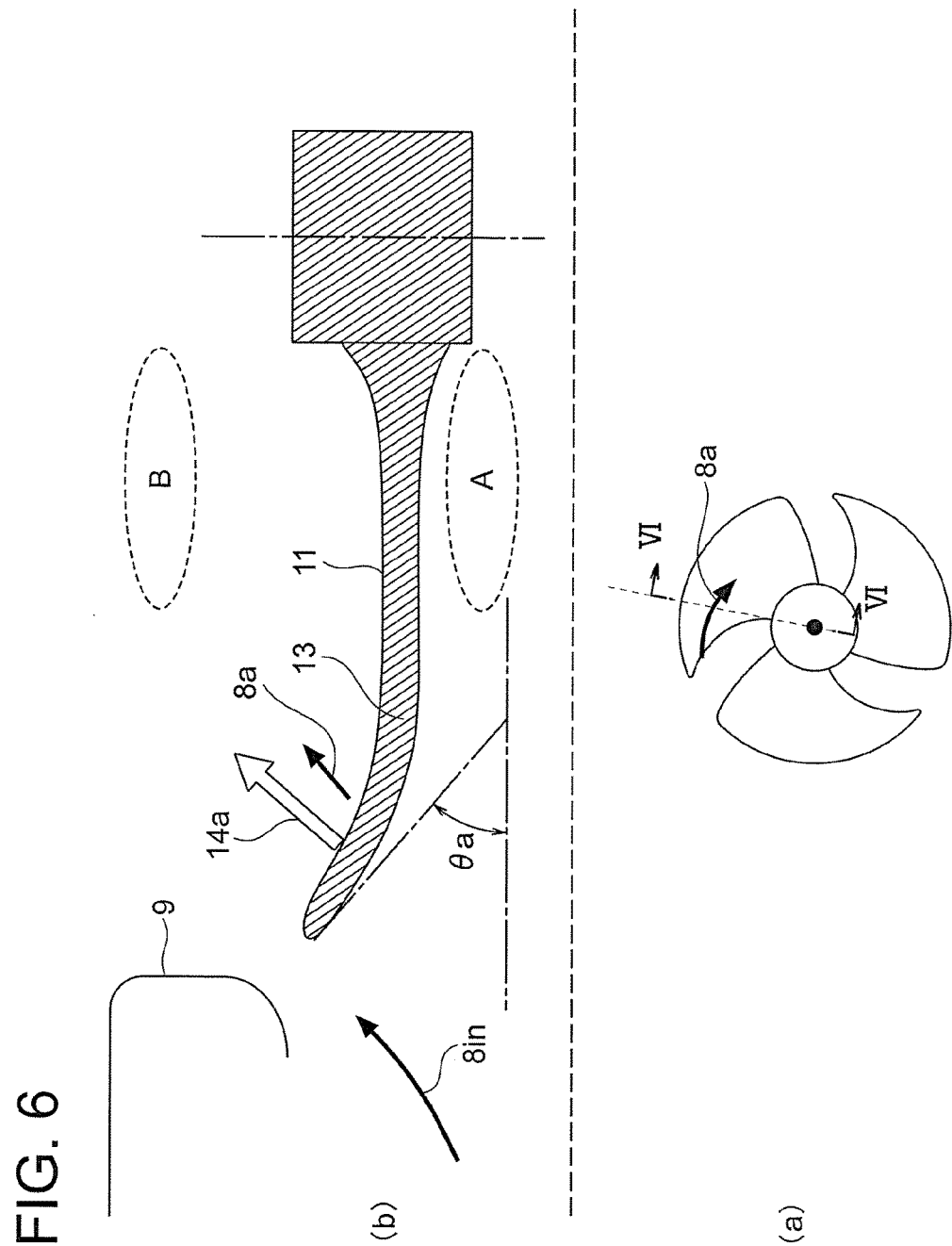
FIG. 6 are radial sectional views illustrating a backward side with respect to FIG. 5 in the same manner as that of FIG. 5.
Figure 7:
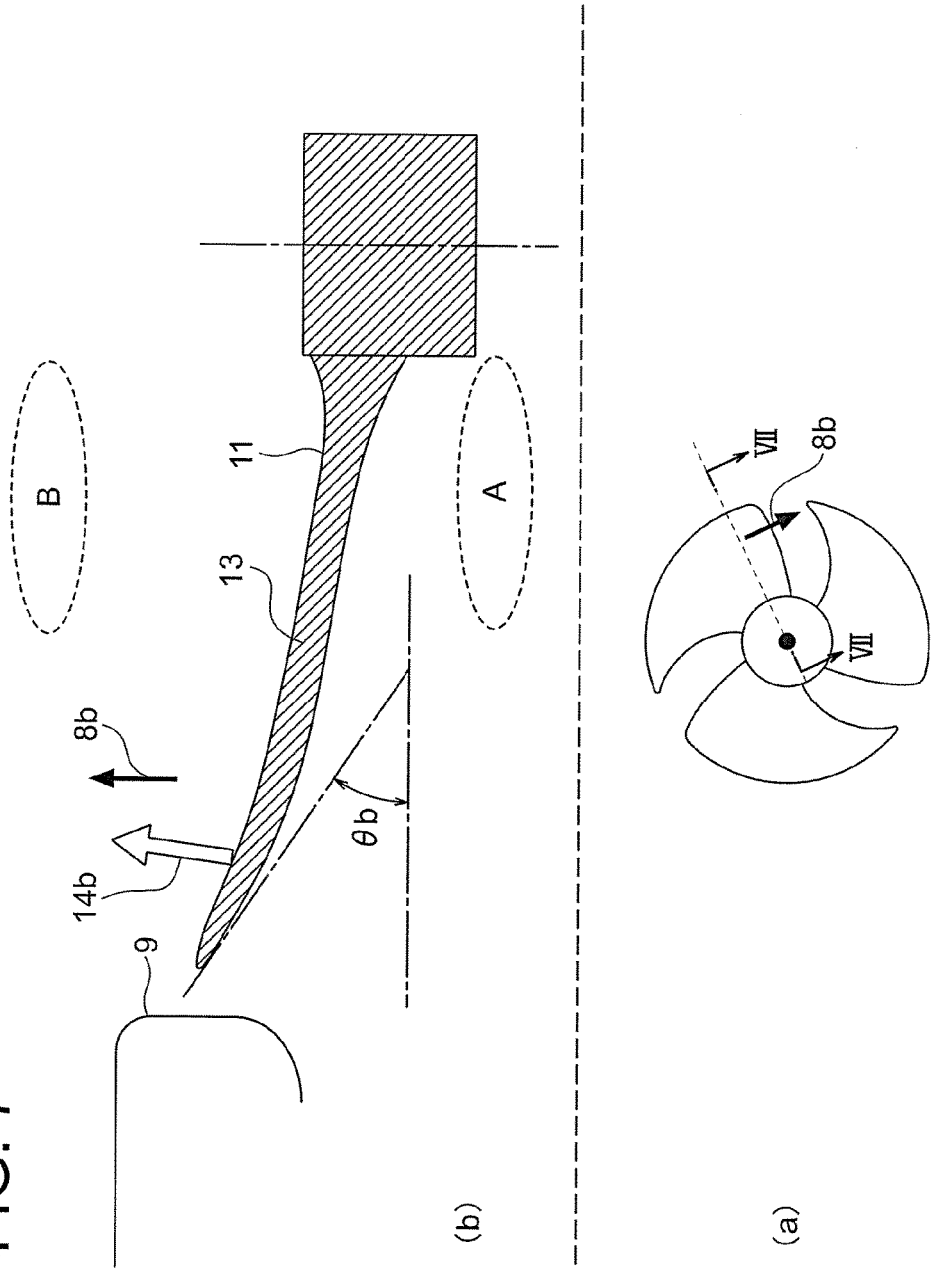
FIG. 7 are radial sectional views of the vicinity of a trailing edge of the blade of the propeller fan.

Now, the function and the operation of the blade according to this embodiment are described with reference to FIGS. 6 and 7. FIGS. 6 and 7 are views illustrating the blade in the same manner as that of FIG. 5. FIGS. 6(b) and 7(b) illustrate cross sections in a radial direction respectively taken along the lines VI-VI and VII-VII of FIGS. 6(a) and 7(a) corresponding thereto. Further, FIG. 6 illustrate a position on a backward side in the rotation direction with respect to FIG. 5, and FIG. 7 illustrate a position on a further backward side in the rotation direction with respect to FIG. 6.

At the leading edge side that is the outer side of the bellmouth (FIG. 6), an outer peripheral end tangent angle θa is large, and a normal to the blade surface on the outer peripheral side with respect to the bending portion is directed to the inner peripheral side (rotation axis side). Therefore, when the air current flowing onto the pressure surface 11 passes by the bending portion 13, a force 14a applied from the blade to the air current works at the inner side. As a result, an air current 8in in the vicinity of the leading edge is gathered toward the rotation axis of the fan, and thus a large amount of air current is supplied to the downstream side, that is, the increase in air-blowing rate is achieved. Further, the normal to the blade surface is directed to the inner peripheral side, and thus an air current 8a flows along the blade surface without leaking from the outer periphery of the blade so that energy is supplied to the air current from the blade. Further, the leakage flow hardly occurs, and hence a vortex generated at an end of the blade can be suppressed, and noise can be reduced with the disturbance of the flow being suppressed. Further, the air current 8in gathered as described above joins the air current 8a flowing along the blade surface without leaking from the outer periphery of the blade, and thus a larger amount of air current is supplied to the downstream side. Also with this, the air-blowing rate can be further increased.

On the other hand, at the trailing edge side that is the inner side of the bellmouth (FIG. 7), an outer peripheral end tangent angle θb is smaller than the above-mentioned angle θa on the leading edge side, and the normal to the blade surface of the bending portion 13 is directed in the axial direction compared to the leading edge side. Therefore, the air current receives a force 14b in the axial direction. As a result, a flow 8b of the air current, which has flowed on the blade surface to increase in energy, is pushed out to the downstream side from the blade surface. In this case, the trailing edge side is surrounded by the bellmouth. Therefore, when the air current is retained between the blades of the fan, there is a risk in that the friction between the bellmouth and the air current may increase to cause the loss of energy and the noise may increase due to the disturbance. However, in this embodiment, the friction is suppressed on the trailing edge side by rapidly discharging the air current in the overlapping region between the trailing edge side and the bellmouth in the axial direction. With such a process, lower noise is achieved by suppressing the generation of a vortex and the friction, and the increase in air-blowing rate is also achieved by actively pushing out the flow to the downstream side while taking in the air current in a manner of gathering the air current and suppressing the friction and leakage.

According to this embodiment configured as described above, in the leading edge portion on the intake side, the air current flowing on the pressure surface is prevented from leaking to the outer periphery with the bending portion that bulges toward the upstream side so that the air current is allowed to flow along the blade surface so as to be supplied with energy. In addition, the angle of the bending portion is set to be gentler toward the trailing edge portion, and the direction of the normal to the blade surface is directed in the axial direction so that the air-blowing rate can be increased while the loss of energy caused by the friction between the air current and bellmouth is suppressed. Further, the leakage flow is suppressed, and hence the disturbance of the air current is suppressed so as to reduce the noise.

Second Embodiment

Figure 8:
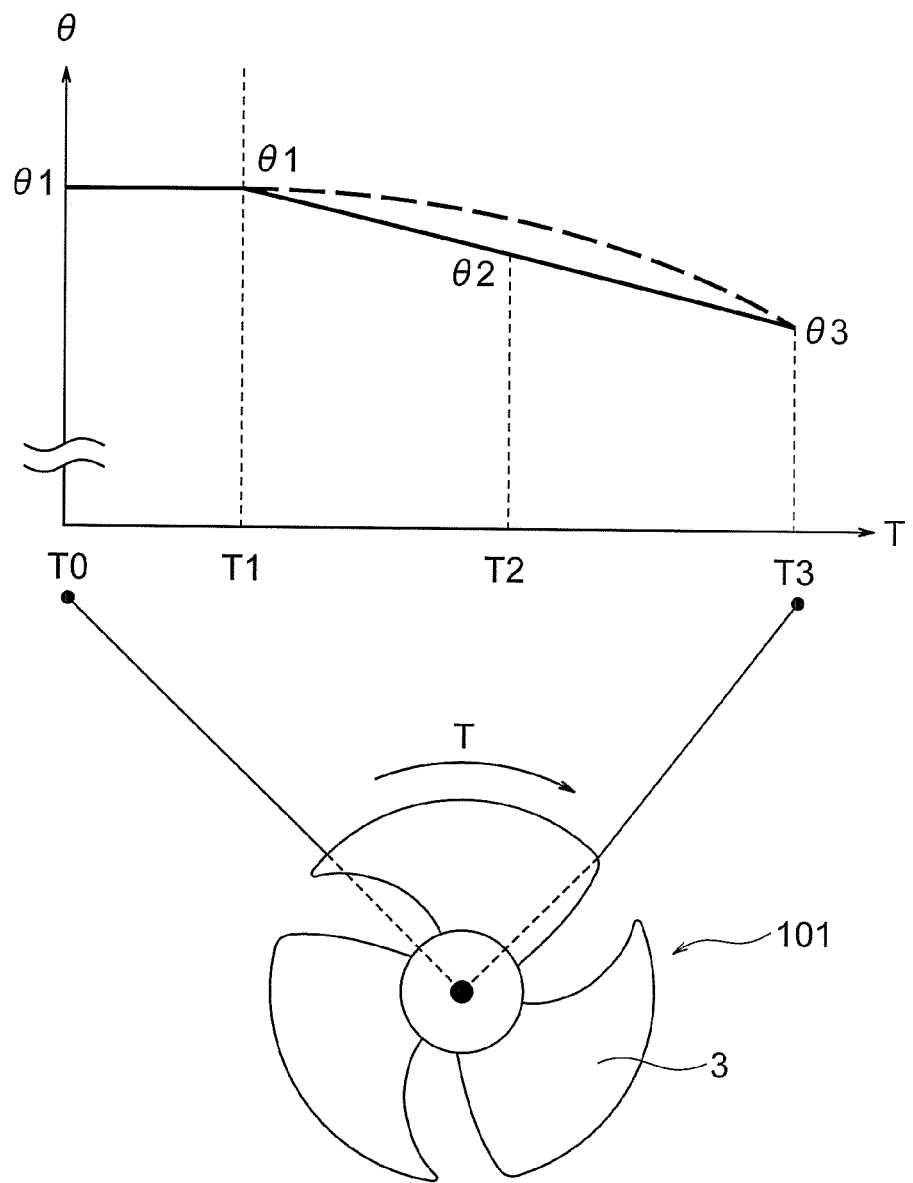
FIG. 8 is a view illustrating a relationship between an outer peripheral end tangent angle θ and a point T at a position from a leading edge to a trailing edge according to a second embodiment of the present invention.
Figure 9:
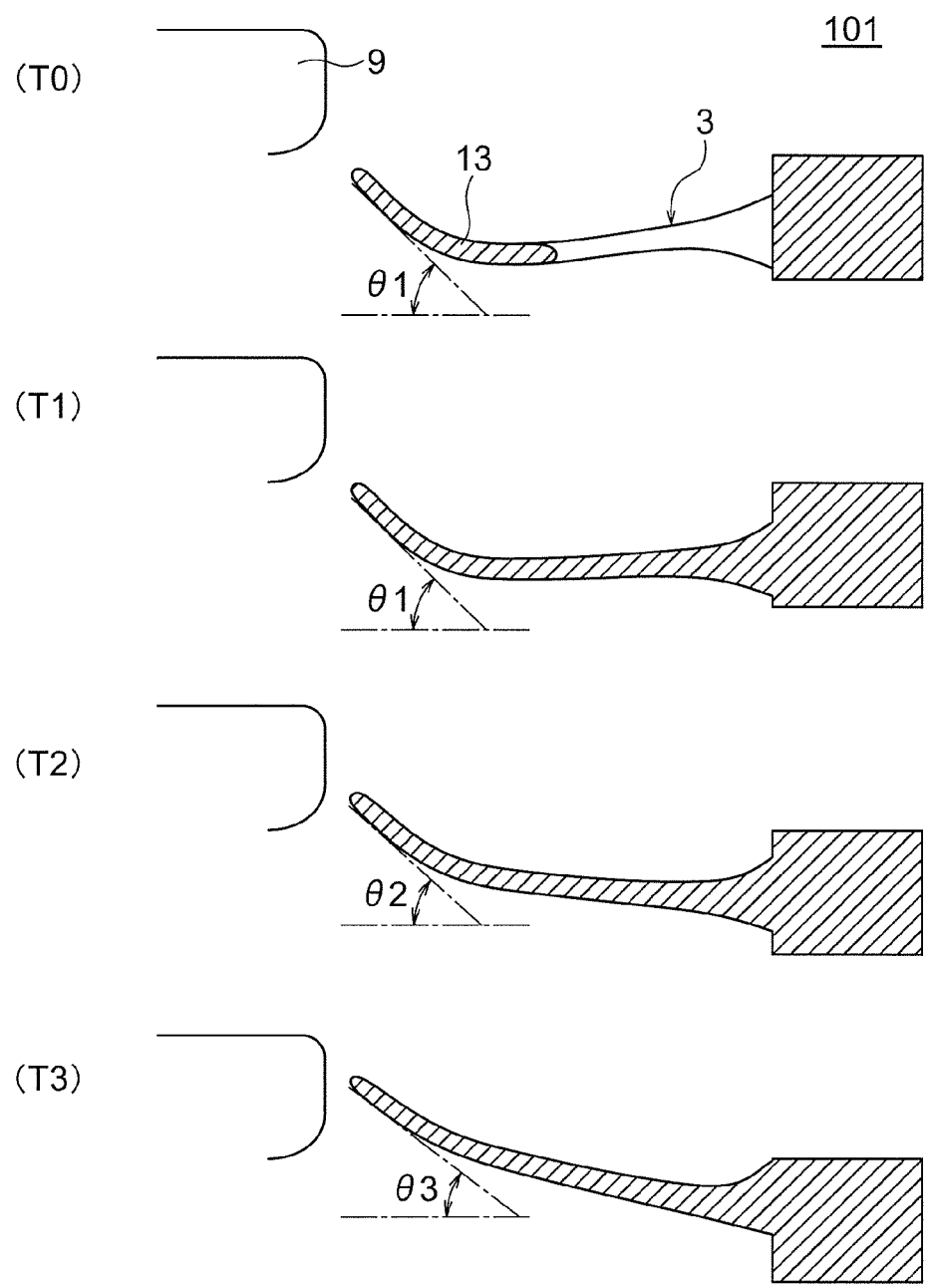
FIG. 9 is a view illustrating cross sections of a blade at T0, T1, T2, and T3.

Next, a second embodiment of the present invention is described with reference to FIGS. 8 and 9. FIG. 8 is a view illustrating a relationship between an outer peripheral end tangent angle θ and each point T at a position from a leading edge to a trailing edge according to the second embodiment. FIG. 9 is a view illustrating cross sections of a blade at T0, T1, T2, and T3.

As illustrated in FIG. 8, in a propeller fan 101 according to the second embodiment, the outer peripheral end tangent angle θ takes a constant value up to the point T1 located between the leading edge portion T0 and the trailing edge portion T3 and then decreases from the point T1 to the trailing edge portion T3. In the illustrated example of FIG. 8, the outer peripheral end tangent angle θ decreases linearly.

Further, in the blade cross sections of FIG. 9, the outer peripheral end tangent angle θ is constant as indicated by θ1 in the blade cross sections at the leading edge portion T0 and the point T1, and the outer peripheral end tangent angle θ decreases to an angle θ2 and an angle θ3 respectively from the point T1 to the points T2 and T3.

Figure 10:
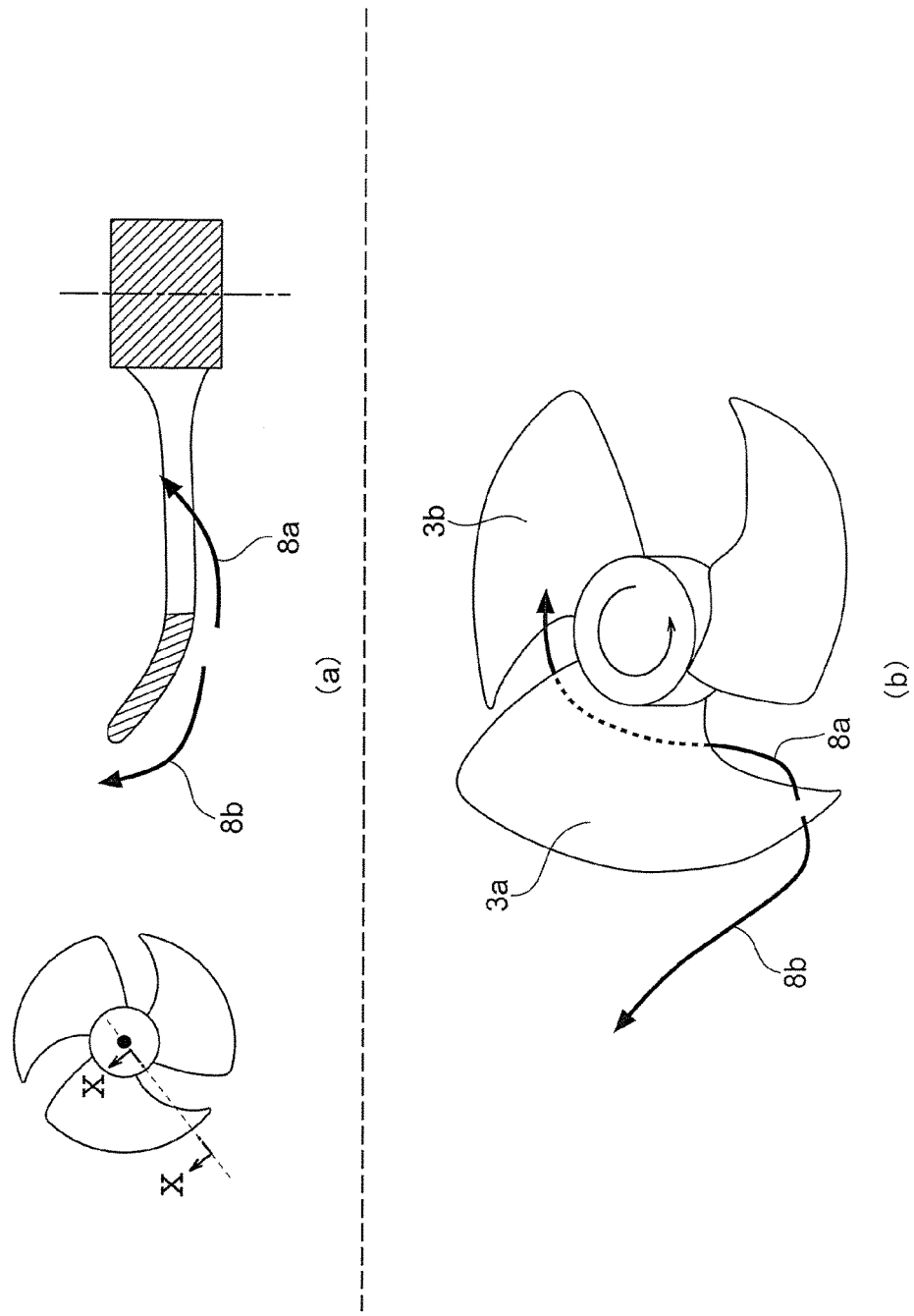
FIG. 10 are views illustrating a state of a flow leaking to an outer side and an inner side in the vicinity of the leading edge of the blade.

In this case, a chord length of the propeller fan is longest on the outer peripheral side, and as illustrated in FIG. 10(a), on the upstream side, only a part of the blade cross section appears in the cross section in the radial direction. Consequently, the air current leaks easily from the blade. As illustrated in FIG. 10(b) illustrating the cross section in the radial direction taken along the line X-X, in the case where a pair of blades adjacent to each other relatively on front and back sides in the rotation direction is focused for convenience sake of description, an air current 18a having leaked to the radially inner side after flowing into a blade 3a on a forward side can be trapped again with a blade 3b on a backward side, which is adjacent to the blade 3a, and thus an opportunity for increasing a pressure again is obtained.

On the other hand, an air current 18b having leaked to the radially outer side cannot be trapped with the adjacent blade 3b, and hence a pressure cannot be increased. Therefore, it is important to hold the air current flowing along the blade surface on the leading edge side (upstream side) so that the air current does not leak to the outer side.

In the second embodiment, as illustrated in FIGS. 8 and 9, the outer peripheral end tangent angle θ is kept constant from the leading edge portion T0 to the point T1 on the way to the downstream side so that the air current does not leak to the radially outer side, and thus the energy is supplied to the air current without fail.

Note that, the angle θ from the point T1 that is the terminal of the constant value θ1 to the trailing edge portion T3 may also decrease in a smooth curved line as indicated by a broken line instead of decreasing in a straight line as illustrated in FIG. 8. For example, in the case where an increase in pressure required by the fan is large, a pressure difference between the pressure surface and the negative pressure surface increases, and hence the formed angle is decreased gently so as to prevent the leakage of the air current. On the contrary, in the case where the pressure difference is small, the angle θ may be decreased more rapidly compared to the above-mentioned solid-line embodiment so as to push out the air current to the downstream side. It is appropriate that the angle be decreased so as to be suited to the environment in which the fan is used.

In the same way as in the first embodiment, even in the above-mentioned second embodiment, the air-blowing rate can be increased and the occurrence of the leakage and the generation of a vortex can be suppressed more efficiently while achieving lower noise.

Third Embodiment

Figure 11:
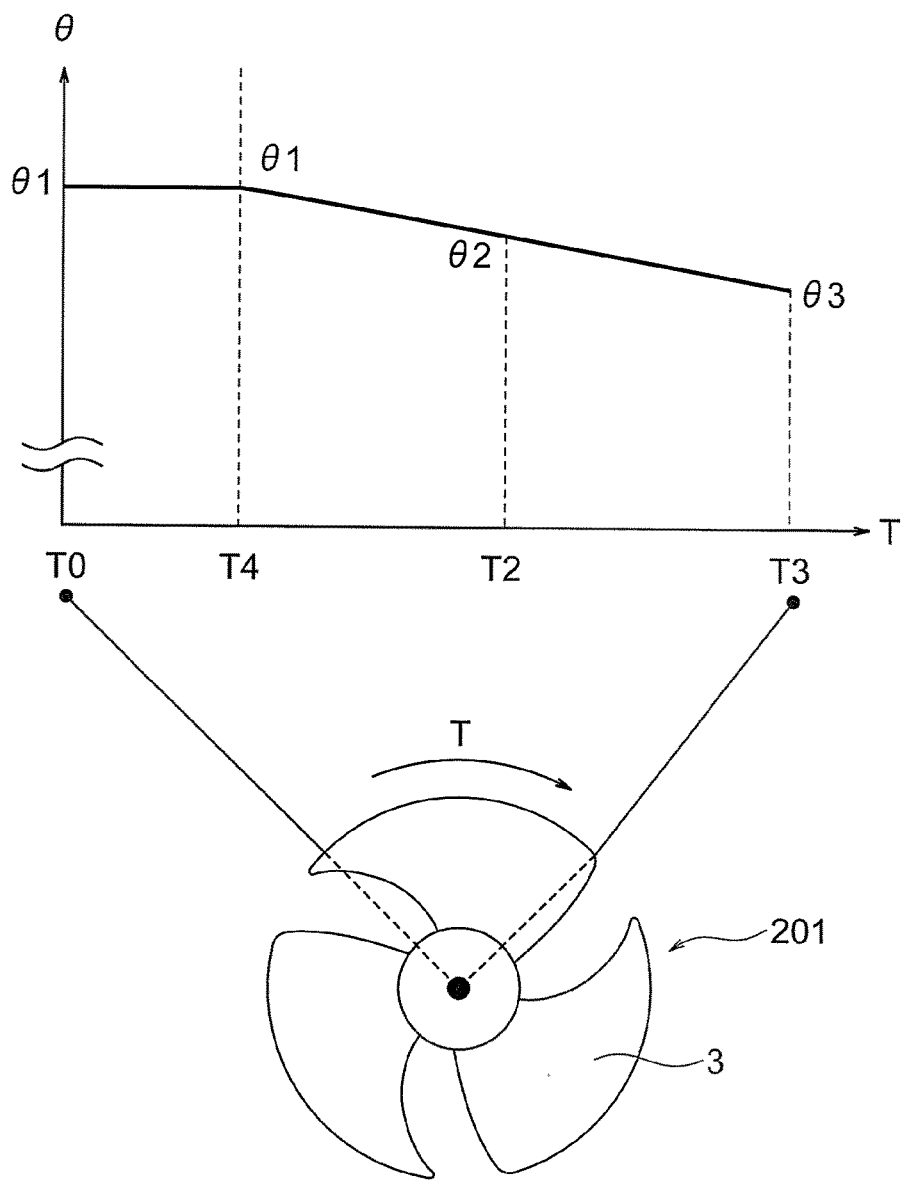
FIG. 11 is a view illustrating a third embodiment of the present invention in the same manner as that of FIG. 8.
Figure 12:
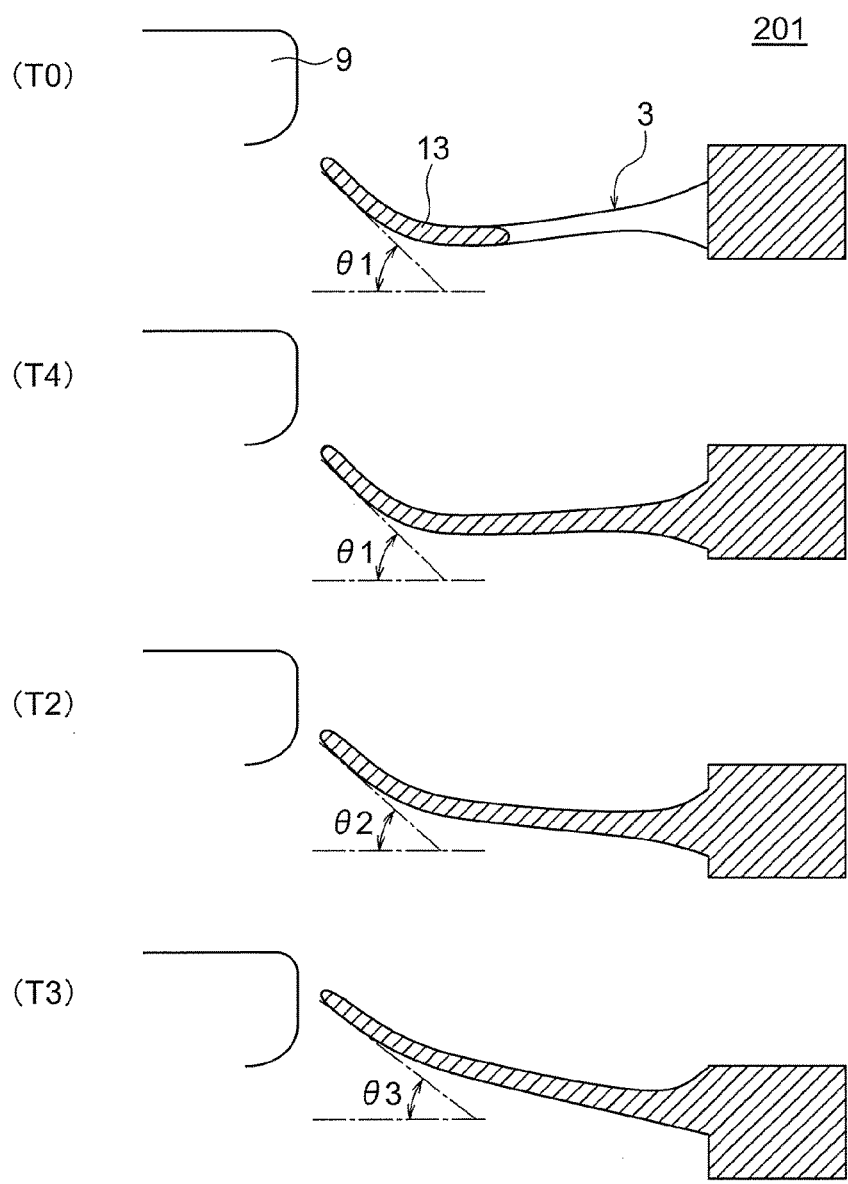
FIG. 12 is a view illustrating the third embodiment of the present invention in the same manner as that of FIG. 9.

Next, a third embodiment of the present invention is described with reference to FIGS. 11 and 12. FIGS. 11 and 12 are views illustrating the third embodiment respectively corresponding to FIGS. 8 and 9. A point T4 of FIG. 11 is a corresponding point of an overlap starting point located at a position of the blade cross section including the above-mentioned overlap starting point 10. In a propeller fan 201 according to the third embodiment, the outer peripheral end tangent angle θ takes a constant value from the leading edge point T0 to the corresponding point T4 of the overlap starting point and then decreases from the corresponding point T4 to the trailing edge portion T3. In the illustrated example of FIG. 11, the outer peripheral end tangent angle θ decreases linearly.

A description is made regarding the foregoing. First, the outer periphery of the propeller fan 201 is kept open in a space from the leading edge portion T1 to the corresponding point T4 of the overlap starting point that overlaps the bellmouth, and hence the air current leaks easily to the outer side. Therefore, the outer peripheral end tangent angle θ is kept constant from the leading edge portion T1 to the corresponding point T4 of the overlap starting point so as to suppress the leakage of the air current. Then, the outer peripheral end tangent angle θ is decreased to θ2 and θ3 respectively from the corresponding point T4 of the overlap starting point to the point T2 and the trailing edge portion T3 on the downstream side. Note that, the process of decreasing the angle is the same as that in the above-mentioned second embodiment.

Also in the third embodiment, the same advantages as those in the second embodiment are obtained, and further, in the third embodiment, in particular, the effect of suppressing the leakage in the open region of the propeller fan 201 efficiently can be obtained.

Fourth Embodiment

Figure 13:
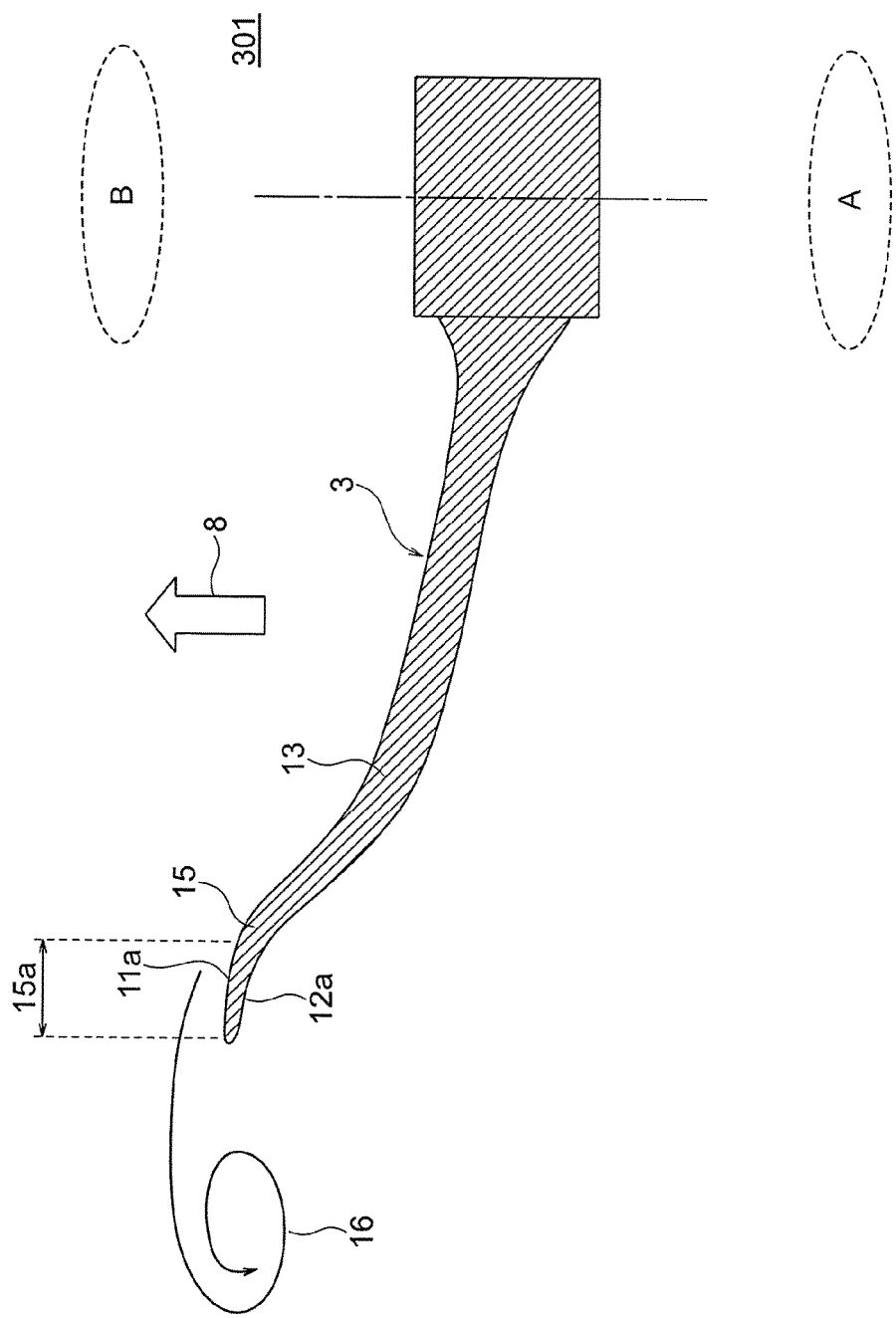
FIG. 13 is a radial sectional view of a blade of a propeller fan according to a fourth embodiment of the present invention.

Next, a fourth embodiment of the present invention is described with reference to FIG. 13. FIG. 13 is a radial sectional view of a blade of a propeller fan according to the fourth embodiment. As illustrated in FIG. 13, in a propeller fan 301 according to the fourth embodiment, an outer peripheral bending portion 15 that bulges toward the downstream side is formed in an outer peripheral portion of the blade 3 with respect to the bending portion 13. Note that, in the fourth embodiment, the outer peripheral end tangent angle θ is also the same as any of the above-mentioned first to third embodiments.

According to the fourth embodiment, the pressure difference between a pressure surface lie and a negative pressure surface 12a in a vicinity 15a of an outer peripheral edge at the outer side with respect to the outer peripheral bending portion 15 is reduced so as to weaken a vortex (blade tip vortex 16) generated due to the leakage of the air current from the outer peripheral portion. Thus, compared to the above-mentioned embodiments of suppressing the leakage of the air current, in the fourth embodiment, the outer peripheral bending portion 15 is used in addition so that the air current can be prevented from generating a strong vortex even in the case of the leakage of the air current, and thus the disturbance of the air current in the case of the leakage thereof is minimized to further reduce the disturbance of the air current that is caused by the vortex, thereby achieving lower noise.

Also in the fourth embodiment, the same advantages as those of the first embodiment are obtained, and further, in the fourth embodiment, the air current is prevented from generating a strong vortex even in the case of the leakage of the air current, considering also the state after the air current leaks, thereby being capable of achieving still lower noise.

Fifth Embodiment

Next, a fifth embodiment of the present invention is described. As the fifth embodiment, the specific application of the above-mentioned propeller fans is described. The propeller fans according to the above-mentioned embodiments relate to the higher efficiency and the lower noise of the propeller fans. When the propeller fans are mounted on air blowers, highly efficient air blowing and an increase in air-blowing rate can be achieved. When the propeller fans are mounted on air conditioners and hot-water supply outdoor units, which are refrigerating cycle devices including compressors and heat exchangers, the amount of an air current passing through the heat exchanger can be increased also due to the highly efficient air blowing, and hence the energy saving of the devices can be realized. Note that, in any of the air blowers, air conditioners, and hot-water supply outdoor units, there is no particular limit to the configurations other than those of the propeller fans, and for example, well-known and existing configurations may be used.

Although the details of the present invention are specifically described above with reference to the preferred embodiments, it is apparent that persons skilled in the art may adopt various modifications based on the basic technical concepts and teachings of the present invention.

REFERENCE SIGNS LIST 1 propeller fan, 2 boss, 3 blade, 9 bellmouth, 10 overlap starting point, 10a imaginary plane, 13 bending portion, 15 outer peripheral bending portion, O rotation axis, P apex, Q outer peripheral end, LQ tangent, θ outer peripheral end tangent angle

The invention claimed is:

1. A propeller fan, comprising:
   a rotatable boss;
   a plurality of blades formed on an outer periphery of the boss; and
   a bellmouth arranged so as to surround the plurality of blades at a trailing edge side of each of the blades, the blade including a bending portion that bulges toward an upstream side in a cross-sectional shape in a radial direction, and wherein, in a blade cross-sectional view, assuming that a tangent at an end of the outer periphery is defined as LQ, an imaginary line orthogonal to a rotation axis O is defined as LO, an angle formed by the tangent LQ and the imaginary line LO is defined as an outer peripheral end tangent angle θ, and a position at which an imaginary plane including a position of an intake-side end portion of the bellmouth and a peripheral edge of the blade cross each other is defined as an overlap starting point, the outer peripheral end tangent angle θ on a trailing edge portion side with respect to a blade cross section including the overlap starting point is smaller than the outer peripheral end tangent angle θ on a leading edge portion side with respect to the blade cross section including the overlap starting point.

2. The propeller fan according to claim 1, wherein the outer peripheral end tangent angle θ is constant between the leading edge portion and an arbitrary point on a backward side of the leading edge portion and decreases between the arbitrary point and the trailing edge portion.

3. The propeller fan according to claim 2, wherein the arbitrary point is located on the blade cross section including the overlap starting point.

4. The propeller fan according to claim 1, wherein the blade comprises, in an outer peripheral portion with respect to the bending portion, an outer peripheral bending portion that bulges toward a downstream side.

5. The propeller fan according to claim 1, wherein the blade comprises a swept blade including an outer side edge positioned on the downstream side of the rotation axis with respect to a base on the boss side in a cross section in the radial direction.

6. An air blower, comprising the propeller fan according to claim 1.

7. An air conditioner, comprising the propeller fan according to claim 1.

8. An outdoor unit for a hot-water supply device, comprising the propeller fan according to claim 1.

9. An outdoor unit, comprising the propeller fan according to claim 1.

10. The propeller fan according to claim 1, further comprising
a connecting portion that gradually extends from the outer periphery of the boss to the bending portion without having a negative slope with respect to the upstream side of the blade.

* * * * *